US008639097B2

(12) United States Patent
Ariya (10) Patent No.: US 8,639,097 B2
(45) Date of Patent: Jan. 28, 2014

(54) VIDEO RECORDING AND PLAYBACK APPARATUS

(75) Inventor: Kanako Ariya, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 585 days.

(21) Appl. No.: 12/760,803

(22) Filed: Apr. 15, 2010

(65) Prior Publication Data
US 2010/0202755 A1 Aug. 12, 2010

Related U.S. Application Data (63) Continuation of application No. PCT/JP2007/001296, filed on Nov. 26, 2007.

(51) Int. Cl.
H04N 5/76 (2006.01)
(52) U.S. Cl.
USPC ............................................. 386/291
(58) Field of Classification Search
USPC ........... 386/291, 293, 297; 709/217; 715/719; 725/10, 13, 34, 38, 46, 53
See application file for complete search history.

(56) References Cited

U.S. PATENT DOCUMENTS

| | | | | |
|---|---|---|---|---|
| 6,088,722 | A * | 7/2000 | Herz et al. | 709/217 |
| 6,727,914 | B1 * | 4/2004 | Gutta | 715/719 |
| 8,230,343 | B2 * | 7/2012 | Logan et al. | 715/723 |
| 2002/0100047 | A1 * | 7/2002 | Matoba et al. | 725/46 |
| 2002/0199193 | A1 * | 12/2002 | Gogoi et al. | 725/46 |
| 2003/0051240 | A1 * | 3/2003 | Schaffer et al. | 725/34 |
| 2003/0131355 | A1 * | 7/2003 | Berenson et al. | 725/46 |
| 2005/0172318 | A1 * | 8/2005 | Dudkiewicz et al. | 725/46 |
| 2005/0278741 | A1 * | 12/2005 | Robarts et al. | 725/46 |
| 2005/0283803 | A1 * | 12/2005 | Kimura et al. | 725/46 |
| 2006/0020973 | A1 * | 1/2006 | Hannum et al. | 725/46 |
| 2006/0212904 | A1 * | 9/2006 | Klarfeld et al. | 725/46 |
| 2007/0028266 | A1 * | 2/2007 | Trajkovic et al. | 725/46 |
| 2007/0033607 | A1 * | 2/2007 | Bryan | 725/10 |
| 2007/0186241 | A1 * | 8/2007 | Sugimoto et al. | 725/46 |
| 2007/0250895 | A1 * | 10/2007 | Yamada | 725/134 |
| 2007/0280629 | A1 * | 12/2007 | Hayashi | 386/46 |

FOREIGN PATENT DOCUMENTS

| | | |
|---|---|---|
| JP | 2000-287189 | 10/2000 |
| JP | 2001-298686 | 10/2001 |
| JP | 2004-355070 | 12/2004 |
| JP | 2007-214869 | 8/2007 |
| WO | 2005/015902 A1 | 2/2005 |
| WO | WO 2007013308 A1 * | 2/2007 |

OTHER PUBLICATIONS

International Search Report for PCT/JP2007/001296, mailed on Feb. 26, 2008.

* cited by examiner

Primary Examiner — Thai Tran
Assistant Examiner — Stephen Smith
(74) Attorney, Agent, or Firm — Staas & Halsey LLP (57) ABSTRACT

A video recording and playback apparatus includes: an operation information acquisition device for acquiring operation information and user identification information; a user identification device for identifying a user; a preference information generation device for generating preference information about a preference of a user; a operation result information acquisition device for acquiring operation result information obtained as a result of recording scheduling and playback operations etc.; a user point calculation device for calculating a user point; and a preference information priority assignment device for determining a priority of preference information.

14 Claims, 11 Drawing Sheets

PREFERENCE INFORMATION A

| KEYWORD | USER POINT | KEYWORD POINT |
|---|---|---|
| A-1 |  | 2 |
| A-2 | 350 | 2 |
| A-3 |  | 1 |

+

PREFERENCE INFORMATION B

| KEYWORD | USER POINT | KEYWORD POINT |
|---|---|---|
| B-1 |  | 2 |
| B-2 | 80 | 2 |
| B-3 |  | 1 |

PREFERENCE INFORMATION (A+B)

| KEYWORD | PREFERENCE VALUE |
|---|---|
| A-1 | 700 |
| A-2 | 700 |
| B-1 | 160 |
| B-2 | 160 |
| A-3 | 350 |
| B-3 | 80 |

VIDEO RECORDING AND PLAYBACK APPARATUS

CROSS-REFERENCE TO RELATED APPLICATIONS

This application is a continuation of PCT application of PCT/JP2007/001296, which was filed on Nov. 26, 2007.

FIELD

The present invention relates to a video recording and playback apparatus. In this document, an apparatus for performing only a recording process or a playback process is also referred to as a "video recording and playback apparatus".

BACKGROUND

Recently, with the development of the information and communication technology, various contents (for example, television broadcast programs) can viewed using means such as digital terrestrial broadcasting, satellite broadcasting, network distributions, etc. With the circumstances, a video recording and playback apparatus for recording or playing back the contents has become widespread. Lately, a video recording and playback apparatus capable of recording the information about user preference for broadcast program contents, and outputting candidates for broadcast program contents to be recorded and played back has been well known. A user can select a broadcast program to be recorded or played back from an output list of recording or playback candidates.

When a plurality of users share and use one video recording and playback apparatus, and if each use has his or her own preference, it might be hard to generate a content list of playback candidates that each user satisfies.

Relating to the problem described above, the patent document 1 discloses a video recording and playback apparatus for scheduling to record a broadcast program according to the priority among a plurality of users who have scheduled to record broadcast programs when they schedule to record the broadcast programs for the same broadcasting periods. The patent document 2 discloses a video recording and playback apparatus capable of easily recording and playing back a broadcast program satisfying the preferences of all users when a plurality of users view a broadcast program.

Patent Document 1: Japanese Laid-open Patent Publication No. 2001-298686

Patent Document 2: International Publication Pamphlet No. WO 05/015902

SUMMARY

According to an embodiment of the invention, the video recording and playback apparatus for receiving any broadcast program contents and video recording and playing back the contents includes: an operation information acquisition device to acquire operation information about video recording and playback for specific broadcast program contents; a user identification device to identify a user according to user identification information for identification of a user; a preference information generation device to extract a keyword from broadcast program information relating to broadcast program contents which are designated by the operation information, and to generate preference information including the keyword for each user; an operation result information acquisition device to acquire operation result information as a result of performing video recording and playback processes according to the operation information; a user point calculation device to calculate a user point for determination of a priority in a plurality of users on a basis of the operation result information; and a preference information priority assignment device to determine a priority of the preference information on a basis of the user point.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

An embodiment of the present invention is described below with reference to FIGS. 1 through 11.

Figure 1:
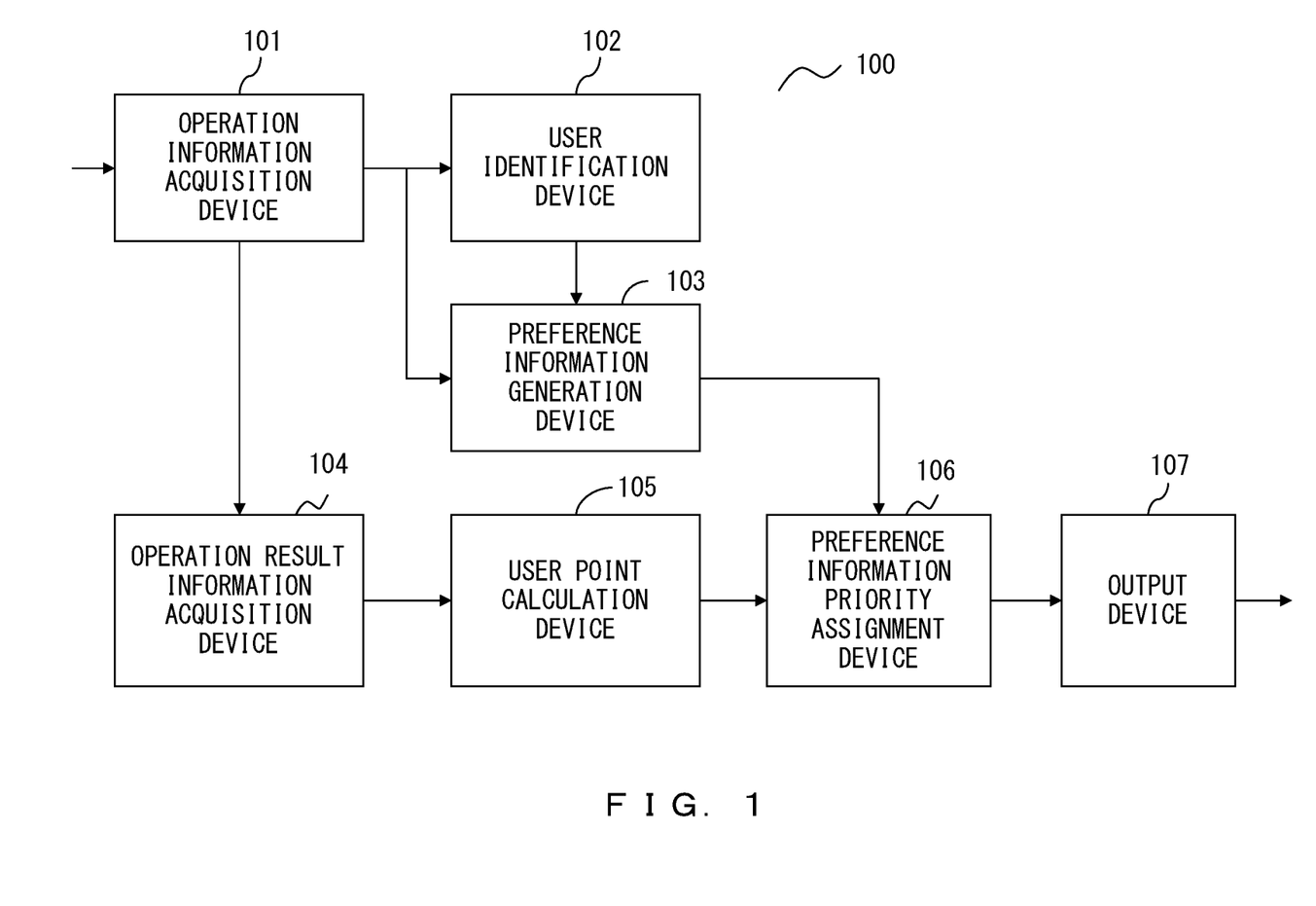
FIG. 1 is an explanatory view of the outline of the video recording and playback apparatus according to an embodiment of the present invention.

FIG. 1 is an explanatory view of the outline of a video recording and playback apparatus 100 according to the present embodiment.

The video recording and playback apparatus 100 illustrated in FIG. 1 includes an operation information acquisition device 101 for acquiring operation information indicating an operation by a user related to recording scheduling and playback, and user identification information for identification of a user, a user identification device 102 for identifying a user from the acquired user identification information, a preference information generation device 103 for generating preference information about the preference of a user, an operation result information acquisition device 104 for acquiring operation result information about a result of an operation performed by a user such as a recording scheduling and playback process etc., a user point calculation device 105 for calculating a user point to be set for each user, and a preference information priority assignment device 106 for determining a priority of preference information.

The video recording and playback apparatus 100 illustrated in FIG. 1 further includes an output device 107 for specifying broadcast program contents from the preference information, generating a list of broadcast program titles according to the priorities of the preference information, and outputting the list to a display device. The video recording and playback apparatus 100 according to the present embodiment records information about the preference of a user relating to broadcast program contents, and displays and outputs a list of broadcast program contents candidates that a user may interested in according to the recorded preference information. The user refers to the broadcast program contents candidate list displayed on a screen, and selects broadcast program contents to be played back or recorded. The preference information can be a keyword set for each broadcast program content for example. The video recording and playback apparatus 100 according to the present embodiment has a function of collecting and recording the preference information for each user.

The operation information acquisition device 101 acquires information about an operation by a user about video recording or playback of specific broadcast program contents specified by, for example, a remote controller.

Similarly, the operation information acquisition device 101 acquires user identification information assigned in advance for each user for identification of a user through a remote controller.

Broadcast program contents are distributed by broadcasting through terrestrial broadcasting, satellite broadcasting, the Internet, a communication cable, etc. The systems of performing broadcasting are not limited to the means above.

The operation information indicates an operation performed by a user on the video recording and playback apparatus. The operation information includes information specifying video recording and playback of broadcast program contents, a title of broadcast program contents to be scheduled for recording (hereinafter referred to as a "recording-scheduled program title"), a title of broadcast program contents to be played back (hereinafter referred to as a "playback program title"), etc.

The user identification device 102 identifies a user who has performed an operation from the user identifier input and acquired through a remote controller. For example, the user identification information assigned in advance for each user is stored in a storage device, and the user corresponding to the acquired user identification information can be designated by referring the storage as needed. The user identification information can be, for example, input by a user operating a key provided on a remote controller.

The preference information generation device 103 acquires broadcast program information about the broadcast program contents specified by the operation information such as a recording-scheduled program title, a playback program title, etc. The preference information generation device 103 extracts a predetermined keyword from the acquired broadcast program information, and generates user preference information. For example, when the broadcast program information is configured in a determined format, a keyword is extracted from the items such as the title of the broadcast program contents in the format, a performer, etc. for determining preference information.

The broadcast program information includes, for example, information relating to the broadcast program contents such as a title of broadcast program contents, a performer, a category, etc. as recorded in the electronic program guide (EPG). Type of the broadcast program information can be used as the preference information is optional.

The preference information can be manually input by a user. In this case, the preference information generation device 103 can directly acquire the user input preference information.

The operation result information acquisition device 104 acquires information that is acquired as a result of a video recording and playback process from the operation information. The acquired information hereinafter referred to as "operation result information". For example, the operation result information includes a recording time of the broadcast program title of recorded broadcast program content (length of broadcast program) and an actual playback time of broadcast program content.

The user point calculation device 105 calculates points for determination of the priorities of the preference information among the users (the points hereinafter referred to as a "user point"). When there are a plurality of users, the user point is calculated for each user.

The preference information priority assignment device 106 determines a priority of the preference information acquired by the preference information generation device 103 depending on the user point. In the present embodiment, a priority is assigned in the ascending order from the user having the highest user point.

The output device 107 retrieves broadcast program information including a keyword of the preference information from EPG. Then, the output device 107 generates a list of broadcast program contents in the detected broadcast program information in which order is rearranged depending on the user points, and outputs the list on the display device of a display unit.

Figure 2:
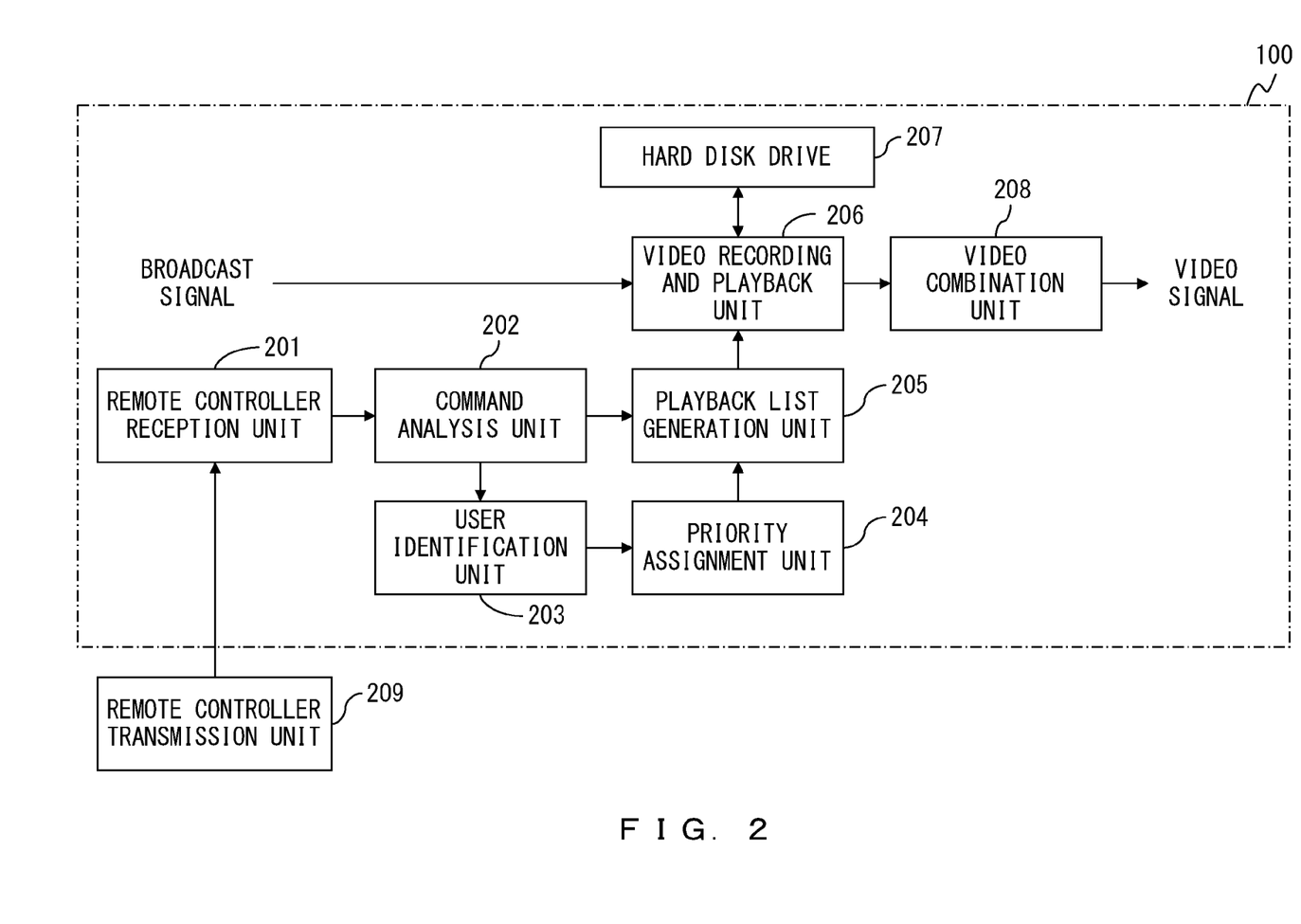
FIG. 2 is an example of a configuration of the video recording and playback apparatus according to an embodiment of the present invention.

FIG. 2 is an example of a configuration of the video recording and playback apparatus 100 according to the present embodiment.

The video recording and playback apparatus 100 illustrated in FIG. 2 includes: a remote controller reception unit 201 for receiving operation information and user identification information sent from a remote controller transmission unit 209; a command analysis unit 202 for analyzing a command included in the operation information, such as a command for specifying recording scheduling, a command for specifying playback, or a command group as a combination of these commands; a user identification unit 203 for identifying a user from user identification information; a priority assignment unit 204 for assigning a priority to preference information; a playback list generation unit 205 for generating a list of broadcast program titles (hereinafter referred to as a "playback list") based on the priorities of the preference information; a video recording and playback unit 206 for performing a video recording and playback process on broadcast program contents; a hard disk drive 207 for storing the broadcast program contents; and a video combination unit 208 for combining a playback list with video data and outputting the combined data to a display device.

The remote controller transmission unit 209 transmits the remote controller reception unit 201 a user identification number assigned to each user. Further, the remote controller transmission unit 209 specifies broadcast program contents to be recorded or played back set by a user through an operation using a remote controller, and specifies a video recording and playback process. The broadcast program contents can be specified by transmitting a broadcast program identification number corresponding to the broadcast program contents from the remote controller transmission unit 209 to the remote controller reception unit 201, or by selecting information for designation of broadcast program contents from a broadcast program table or a playback list displayed on a display device.

The remote controller reception unit 201 receives operation information and user identification information transmitted from the remote controller transmission unit 209, and notifies the command analysis unit 202 of the information received from the remote controller transmission unit 209.

The command analysis unit 202 analyzes a command included in the operation information transmitted from the remote controller transmission unit 209. The command analysis unit 202 then issues an instruction to each component of the video recording and playback apparatus 100 for performing a recording (recording scheduling) process, a playback process, etc. based on the analyzed command.

For example, when the video recording process is performed, the command analysis unit 202 instructs the video recording and playback unit 206 to record specified broadcast program contents. When the playback process is performed, the command analysis unit 202 instructs the playback list generation unit 205 to generate a playback list of the recorded broadcast program contents and display the playback list on the display. When any broadcast program contents are selected through the remote controller reception unit 201, the command analysis unit 202 instructs the video recording and playback unit 206 to play back the broadcast program contents, and the playback process is performed.

The user identification unit 203 designates a user according to the user identification information transmitted from the remote controller transmission unit 209. For example, the user identification unit 203 compares the user identification information stored in advance for each user with the user identification information transmitted from the remote controller transmission unit 209, and designates the user.

The priority assignment unit 204 generates preference information. For example, the priority assignment unit 204 acquires the broadcast program information about the broadcast program contents to be recorded and/or played back. Then, the priority assignment unit 204 extracts an item relating to the broadcast program contents such as a category, a performer, etc., from the acquired broadcast program information, and defines as preference information.

The priority assignment unit 204 assigns a priority to preference information. For example, the priority assignment unit 204 calculates a user point for each user from the recording time and the playback time of the recorded broadcast program, and assigns a priority to preference information depending on the user point.

Furthermore, the priority assignment unit 204 notifies the playback list generation unit 205 of the priority assigned preference information.

The playback list generation unit 205 generates a playback list that contains broadcast program titles matches the preference information notified from the priority assignment unit 204. In this case, the broadcast program title of the playback list is arranged in an order based on the priorities determined by the priority assignment unit 204. The playback list generation unit 205 notifies the video recording and playback unit 206 of the playback list.

Upon receipt of the playback instruction from the command analysis unit 202, the video recording and playback unit 206 notifies the video combination unit 208 of the playback list notified from the playback list generation unit 205, and displays the playback list on the display.

When a broadcast program title is selected from the playback list, the video recording and playback unit 206 reads the contents of the selected broadcast program title from the hard disk drive 207, and transmits them to the video combination unit 208.

In addition, upon receipt of the record instruction from the command analysis unit 202, the video recording and playback unit 206 stores the broadcast program contents specified by the record instruction in the hard disk drive 207.

The video combination unit 208 converts the playback list notified from the video recording and playback unit 206 into a predetermined format, combines the playback list with images if necessary, and outputs the playback list to the display.

(First Embodiment)

Figure 3:
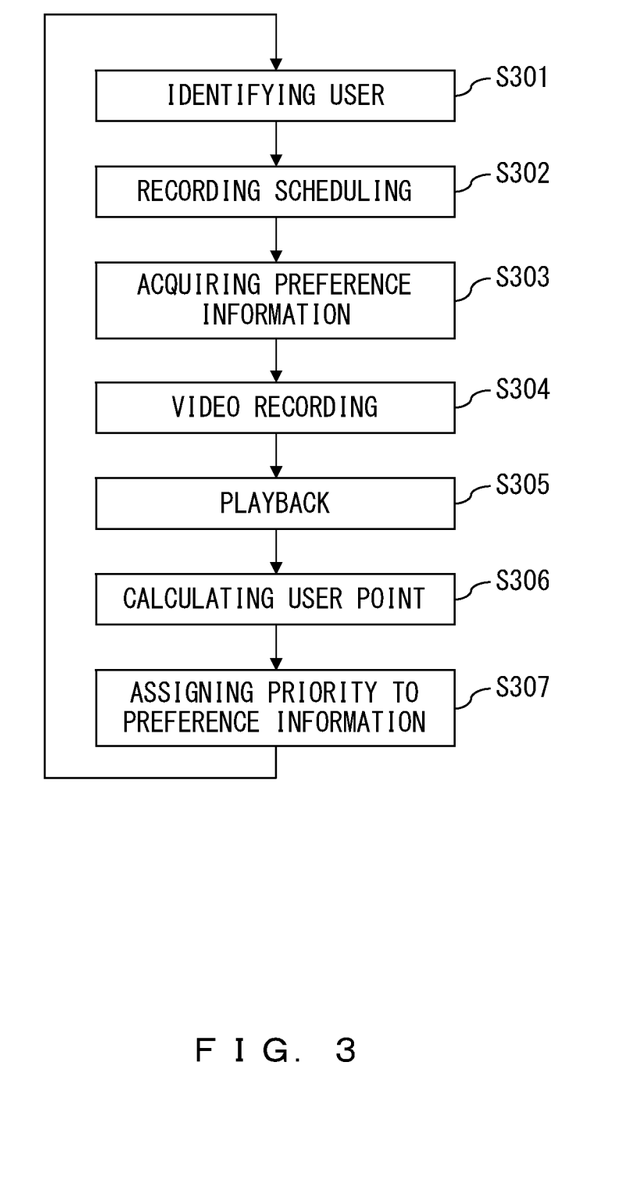
FIG. 3 is a flowchart of the outline of a priority assigning process for the video recording and playback apparatus according to an embodiment of the present invention.

FIG. 3 is a flowchart of a priority assigning process for the video recording and playback apparatus 100 according to the present embodiment.

In step S301, when the remote controller reception unit 201 receives user identification information, the video recording and playback apparatus 100 designates a user who has performed an operation on the video recording and playback apparatus 100.

In step S302, when the remote controller reception unit 201 receives the operation information about the recording scheduling, the video recording and playback apparatus 100 sets the recording scheduling on the broadcast program contents specified by the operation information. The recording scheduling refers to the process of recording broadcast program contents after receiving desired broadcast program contents at a desired time using, for example, a timer. The recording scheduling can be performed in a common method, and the detailed description is omitted here.

When the time periods of a plurality of recording-scheduled broadcast programs overlap, the priorities of preference information determined in the process in step S307 can be referenced, and the broadcast program contents including the preference information having higher priorities can be recording-scheduled.

In step S303, the video recording and playback apparatus 100 extracts a keyword from the broadcast program information about the broadcast program contents designated by the operation information, and generates the preference information corresponds to an identified user. The video recording and playback apparatus 100 acquires the information about the broadcast program contents designated by the operation information from, for example, the EPG acquired in advance. Then, the video recording and playback apparatus 100 extracts a keyword such as a performer, a category, etc., as preference information from the information acquired from the EPG.

In step S304, the video recording and playback apparatus 100 performs video recording process according to the recording scheduling set in step S302. When the recording of the specified broadcast program contents is completed, the recording time (hereinafter referred to as a "length of content") is stored for each broadcast program title.

When the remote controller reception unit 201 receives an instruction to display a playback list, the video recording and playback apparatus 100 generates a playback list, and displays the playback list on the display screen of a monitor not illustrated in the attached drawings. In this case, for example, the video recording and playback apparatus 100 refers to the hard disk drive 207, and generates a list of recorded broadcast program contents (hereinafter referred to as a "recorded broadcast program list"). The video recording and playback apparatus 100 also refers to the priority of the preference information determined in the process in step S307. Then, the video recording and playback apparatus 100 generates a playback list by rearranging the recorded broadcast program list in the order of broadcast program contents includes preference information having higher priorities, and displays the playback list on the display screen.

The playback list can include thumbnail image information acquired from each broadcast program content as necessary.

In addition, the playback list that is rearranged based on the priorities of the preference information determined in the process in step S307 can be generated only when a plurality of users are identified. In other cases, the recorded broadcast program list can be used as a playback list. When a plurality of users are identified, for example, they are identified in the process in step S301 within a predetermined period.

In step S305, when any broadcast program title is selected from a playback list by a user, the video recording and playback apparatus 100 reads the title of the selected video-recorded broadcast program from the hard disk drive 207, outputs the read title on the display device of a display unit, and performs a playback process.

Otherwise, at an instruction from a user, a video recorded broadcast program designated by operation information is read from the hard disk drive 207, output to the display device of a display unit, and a playback process is performed.

In this case, the video recording and playback apparatus 100 stores the playback time of the broadcast program title. Then, the video recording and playback apparatus 100 calculates the ratio of the playback time to the recording time for the broadcast program title (hereinafter referred to as a "playback ratio"). The video recording and playback apparatus 100 then stores the playback ratio for each broadcast program title corresponding to a user in the storage device together with the length of the contents acquired in step S304. The length of the contents acquired in step S304 and the playback ratio for a broadcast program title acquired in step S305 are stored in the storage device as information obtained as a result of the operation performed by a user designated in step S301.

The information is referred to as "operation result information". The operation result information according to the present embodiment is generated for each user, and includes the user identification information, the length of the contents, and the playback ratio for each broadcast program title.

In step S306, the video recording and playback apparatus 100 calculates the user point corresponding to the user from the length of contents acquired in step S304 and the playback ratio calculated in step S305. The method of calculating a user point is described later.

In step S307, the video recording and playback apparatus 100 performs the process of assigning a priority to the preference information acquired and accumulated in step S303 based on the user point calculated in step S306.

Figure 4:
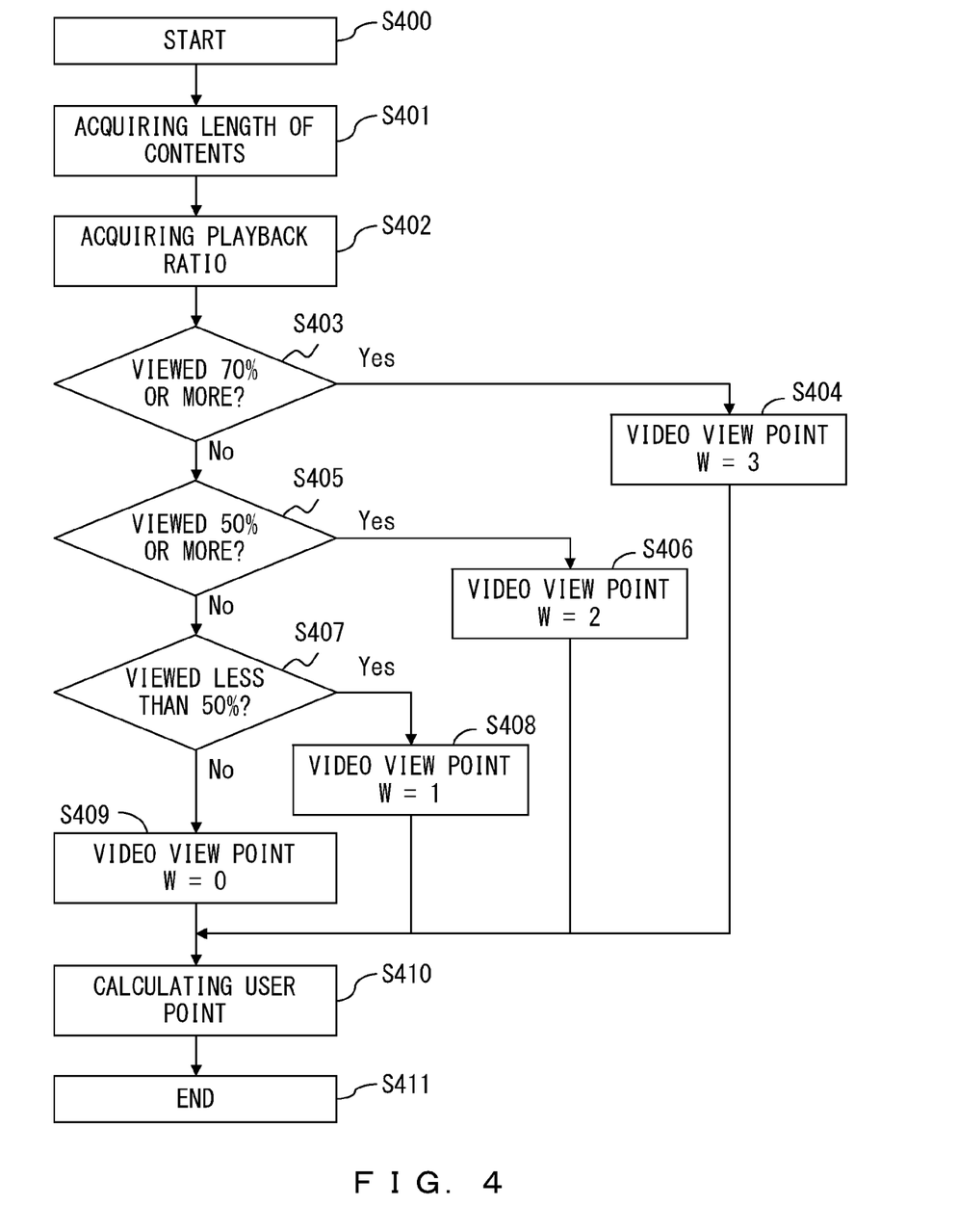
FIG. 4 is a flowchart of a practical example of a process of calculating a user point according to an embodiment of the present invention.

FIG. 4 is a flowchart of a practical example of the process of calculating a user point according to the present embodiment.

In step S401, the video recording and playback apparatus 100 designates a broadcast program title from the operation result information. Hereinafter, a designated broadcast program title is referred to as a "specific broadcast program title". Then, the length of contents of a specific broadcast program title is acquired from the operation result information. In step S402, the video recording and playback apparatus 100 acquires the playback ratio of the specific broadcast program title from the operation result information.

In step S403, the video recording and playback apparatus 100 determines whether or not the playback ratio acquired in step S402 is 70% or more. If the playback ratio is 70% or more, the video recording and playback apparatus 100 passes control to step S404. Then, the video view point W is set to 3 (W=3) in step S404.

In step S403, if it is determined that the playback ratio is less than 70%, the video recording and playback apparatus 100 passes control to step S405.

In step S405, the video recording and playback apparatus 100 determines whether or not the playback ratio acquired in step S402 is 50% or more. If the playback ratio is 50% or more, the video recording and playback apparatus 100 passes control to step S406. The video view point W is set to 2 (W=2) in step S406.

If it is determined in step S405 that the playback ratio is less than 50%, the video recording and playback apparatus 100 passes control to step S407.

In step S407, the video recording and playback apparatus 100 determines whether or not the playback ratio acquired in step S402 is larger than 0. If the playback ratio is larger than 0, the video recording and playback apparatus 100 passes control to step S408. In step S408, the video view point W is set to 1 (W=1).

If it is determined in step S407 that the playback ratio is 0, the video recording and playback apparatus 100 passes control to step S409, and sets the video view point W to 0 (W=0) in step S409. The playback ratio of 0 refers to that the broadcast program contents have not been viewed. The video recording and playback apparatus 100 performs the process in steps S401 through S409 on all broadcast program titles included in the operation result information, and passes control to step S410.

In step S410, the video recording and playback apparatus 100 calculates the user point for each user from the sum of the product of the length of contents of each broadcast program title and the video view point.

If the lengths of contents of the broadcast program titles T1, T2, T3, . . . , and Tn viewed by a user are respectively L1, L2, L3, . . . , and Ln, and the video view points of the broadcast program titles T1, T2, T3, . . . , and Tn are W1, W2, W3, . . . , and Wn respectively, then the user point P of the user is calculated by the following equation.

$$P = L1*W1 + L2*W2 + L3*W3 + \ldots + Ln*Wn \quad (1)$$

In the present embodiment, the user point calculated by the equation (1) is calculated for each user, and the user point calculated for assigning the priority of the preference information is used.

Thus, in the process in FIG. 4, the recording of the broadcast program contents is scheduled, and when a user actually viewed the broadcast program contents, a video view point is calculated and assigned to the user. Especially, the video view tendency of a user is reflected in assigning and calculating a video view point, and the video view point value assigned depending on the playback ratio of the broadcast program contents is changed. Thus, a user who uses the video recording and playback apparatus more frequently and utilizes the broadcast program contents more effectively is assigned a higher video view point, thereby prioritizing the user.

The user point for the broadcast program contents can be individually calculated each time a broadcast program content is played back.

The calculation of the sum of the user point in S410 can be appropriately performed each time a broadcast program content is played back.

Figure 5:
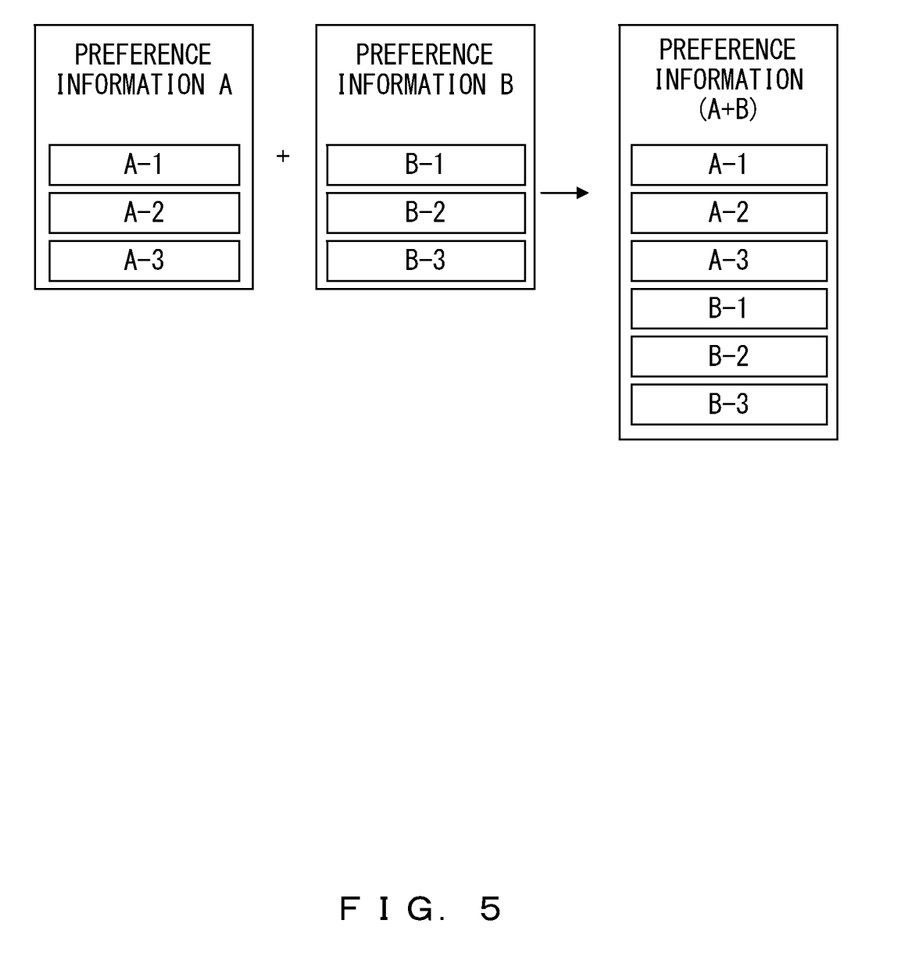
FIG. 5 is an explanatory view of a first priority assigning process according to an embodiment of the present invention.

FIG. 5 is an explanatory view of the first priority assigning process according to the present embodiment. To easily understand the present embodiment, the number of users described in this example is two, that is, a user A and a user B.

However, the priorities can be assigned similarly in the case in which the number of users is three or more.

The preference information A is information about the user A extracted in the process in step S303 as illustrated in FIG. 3, and has the keywords A-1, A-2, and A-3. The preference information A is assigned the priorities in the order of A-1, A-2, and A-3. Similarly, the preference information B is information about the user B extracted in the process in step S303 as illustrated in FIG. 3, and has the keywords B-1, B-2, and B-3. The preference information B is assigned the priorities in the order of B-1, B-2, and B-3.

The first priority assigning process is a process of assigning a higher priority to the preference information of a user having a higher user point. In this example, the user point of the user A is first compared with the user point of the user B, and a user to be prioritized is selected depending on the comparison result.

For example, when the user point of the user A is higher than that of the user B, the user A is prioritized. Then, the preference information A is precedes the preference information B. Practically, as illustrated in FIG. 5, higher priorities are assigned to the keywords A-1, A-2, and A-3 of the preference information A in this order. Then, higher priorities are assigned to the keywords B-1, B-2, and B-3 of the preference information B in this order. In the "preference information (A+B)" in FIG. 5, the keyword is arranged in the order of A-1, A-2, A-3, B-1, B-2, and B-3.

The priority of a keyword in the preference information A can be assigned by, for example, counting the number of occurrences of the keyword when the keyword is extracted in step S303, and assigning a higher priority to a keyword in the descending order of the number of occurrences. In FIG. 5, the number of occurrences is larger in the order of the keywords A-1, A-2, and A-3. Similarly, the preference information B is processed. Priorities among the keywords in the same preference information can also be assigned in the cases illustrated in FIGS. 6, 7 and 9.

Thus, a video recording and playback candidate list of broadcast program contents is generated using the preference information in which a priority is assigned to a keyword. The candidate list is generated by extracting broadcast program contents having a keyword set in the preference information from the electronic program guide. In this case, the broadcast program contents having a keyword assigned a higher priority are to be extracted on a priority basis from the electronic program guide. Then by outputting the generated candidate list on the display screen, the user can select broadcast program contents to be video recorded or played back from the candidate list. Since the preference information is assigned a priority by prioritizing the preference of the user A, the broadcast program contents to be displayed on the candidate list also reflect the preference of the user A.

Figure 6:
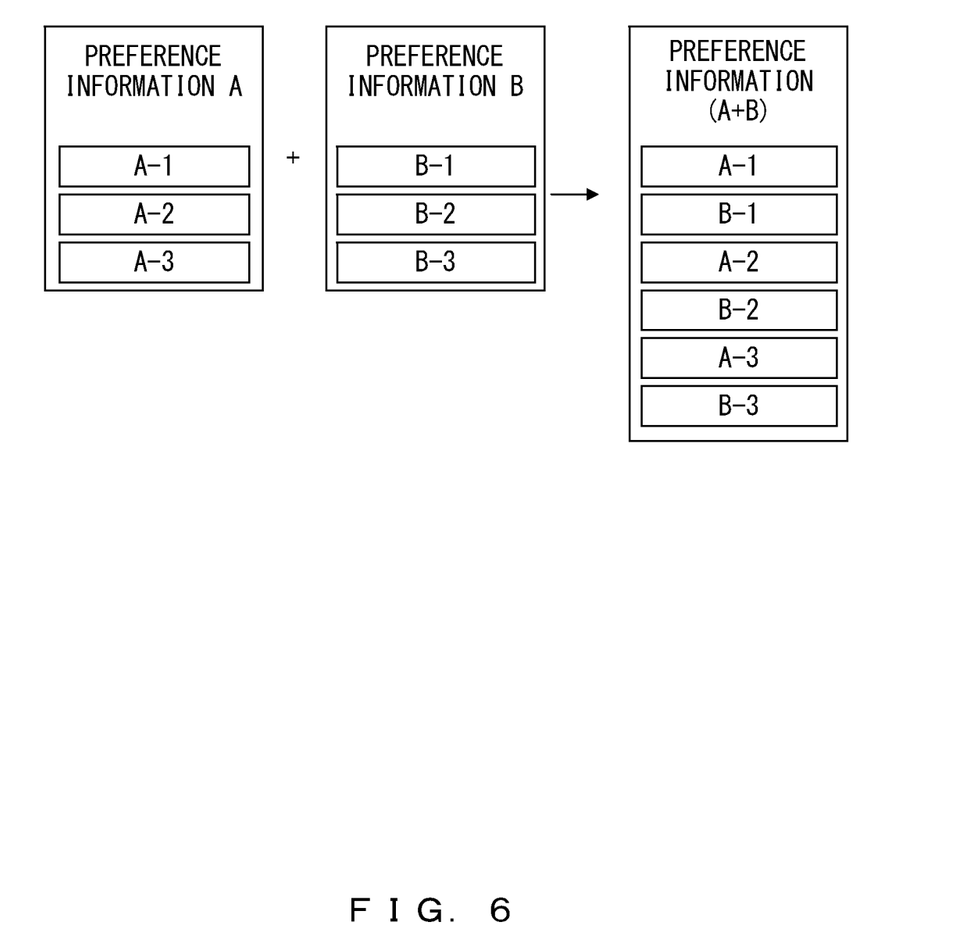
FIG. 6 is an explanatory view of a second priority assigning process according to an embodiment of the present invention.

FIG. 6 is an explanatory view of the second priority assigning process according to the present embodiment.

The second priority assigning process is to extract one keyword in the descending order of the priority from the preference information for each user, and alternately arrange the keywords corresponds to each user extracted in the descending order of a user point.

For example, when the user point of the user A is higher than that of the user B, the keyword A-1 having the first priority is first acquired from the preference information A. Then, the keyword B-1 having the first priority is first acquired from the preference information B, and the keyword B-1 is arranged after the keyword A-1 having a higher user point. Similarly, depending on the priority of the set keyword and the user point of an individual user, the keywords are arranged in the order of the keywords A-2, B-2, A-3, and B-3.

The "preference information (A+B)" illustrated in FIG. 6 indicates the state in which the preference information about the users A and B is rearranged in the order above.

Figure 7:
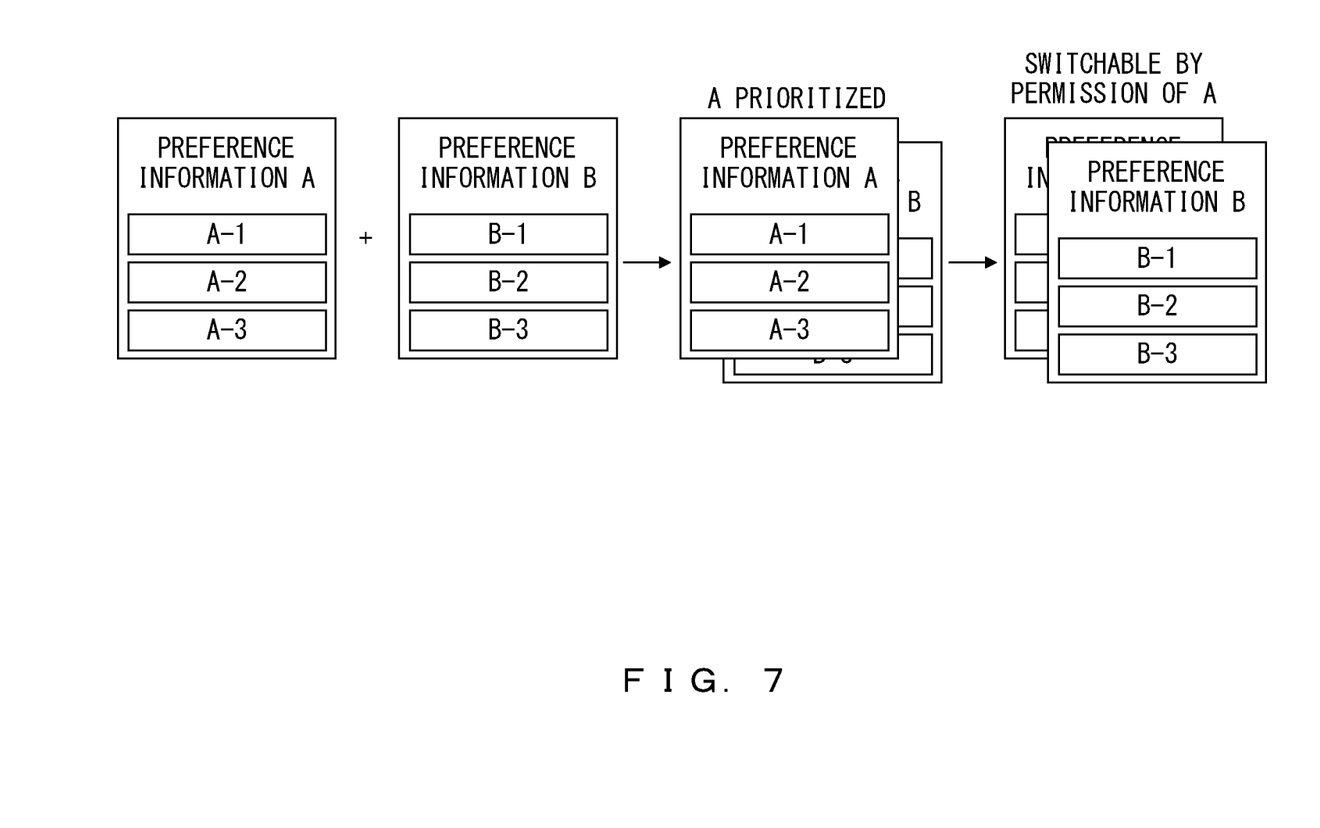
FIG. 7 is an explanatory view of a third priority assigning process according to an embodiment of the present invention.

FIG. 7 is an explanatory view of the third priority assigning process according to the present embodiment.

The third priority assigning process uses on a priority basis only the user preference information having a higher user point.

For example, when the user point of the user A is higher than that of the user B, only the preference information A A is used in generating a video recording and playback candidate list, and the preference information B is not considered in generating the candidate list as illustrated in FIG. 7. In the example in FIG. 7, higher priorities are assigned to the keywords A-1, A-2, and A-3 in this order in the preference information A. If the preference information B corresponding to the user B is reflected in generating a candidate list, the information is switched to the preference information B by, for example, the permission of the user A. With the configuration, the preference information about the user A can be correctly reflected by selecting the video recording and playback contents.

(Second Embodiment)

In the embodiment described above, a user point is used in assigning a priority to preference information, but a point for determination of the priorities among the keywords of the preference information can also be used. The point for determination of the priorities among the keywords is hereinafter referred to as a "keyword point".

Figure 8:
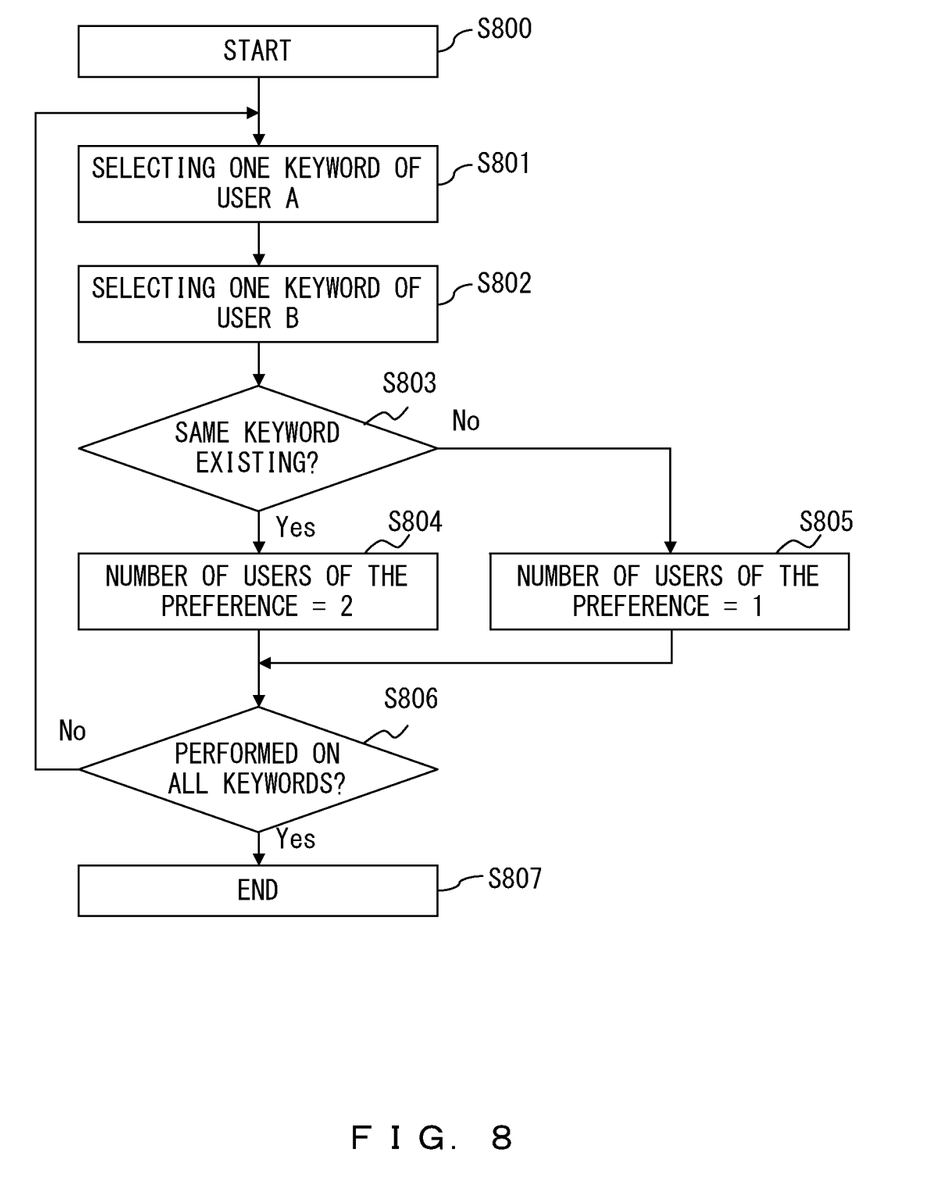
FIG. 8 is a flowchart of a practical example of the capability of calculating a keyword point according to an embodiment of the present invention.

FIG. 8 is a flowchart of a practical example of calculating a keyword point according to the present embodiment. Two users A and B are described for comprehensibility, but a priority can be assigned in a similar process in case there are three or more users. The flowchart illustrated in FIG. 8 corresponds to the processes in steps S306 and S307 in FIG. 3.

The outline of the process of the video recording and playback apparatus 100 is, calculating a user point, simultaneously calculating a keyword point about the preference information acquired and accumulated in step S303, and assigning a priority to the preference information from the user point and the keyword point in step S307.

In step S801, the video recording and playback apparatus 100 selects one optional keyword from the preference information A. The selected keyword is hereinafter referred to as a "specific keyword".

In step S802, the video recording and playback apparatus 100 refers to the preference information B, and selects any keyword corresponding to the user B.

In step S803, the video recording and playback apparatus 100 determines whether or not the keyword selected from the preference information B is the same as the specific keyword selected from the preference information A. If there is the same keyword, control is passed to step S804. Then, in step S804, the "number of users of the preference" of the specific keyword is set to 2. The "number of users of the preference" refers to the information indicating the number of users who have selected the specific keyword.

If it is determined in step S803 that there is not the same keyword as the specific keyword in the preference information B, the video recording and playback apparatus 100 passes control to step S805, and sets the "number of users of the preference" of the specific keyword to 1 in step S805.

In step S806, the video recording and playback apparatus 100 determines whether or not the processes in steps S801 through S805 have been performed on all keywords included in the preference information A. If the processes in steps S801 through S805 have been performed on all keywords in the preference information A, then the video recording and playback apparatus 100 passes control to step S807, and terminates the keyword point calculating process on the keywords included in the preference information A.

When the preference information A includes any keyword on which the processes in steps S801 through S805 have not been performed, the video recording and playback apparatus 100 passes control to step S801. Then, the processes in steps S801 through S805 are performed on the keywords which are included in the preference information A and on which the processes in steps S801 through S805 have not been performed.

In the above-mentioned processes, a keyword point is calculated for each keyword of the preference information A. In addition, the keyword point of each keyword included in the preference information B is calculated in the similar process.

Likewise, the process of calculating the number of users of the preference is performed on the keyword included in the preference information about each user for the case in which there are three or more users.

Figure 9:
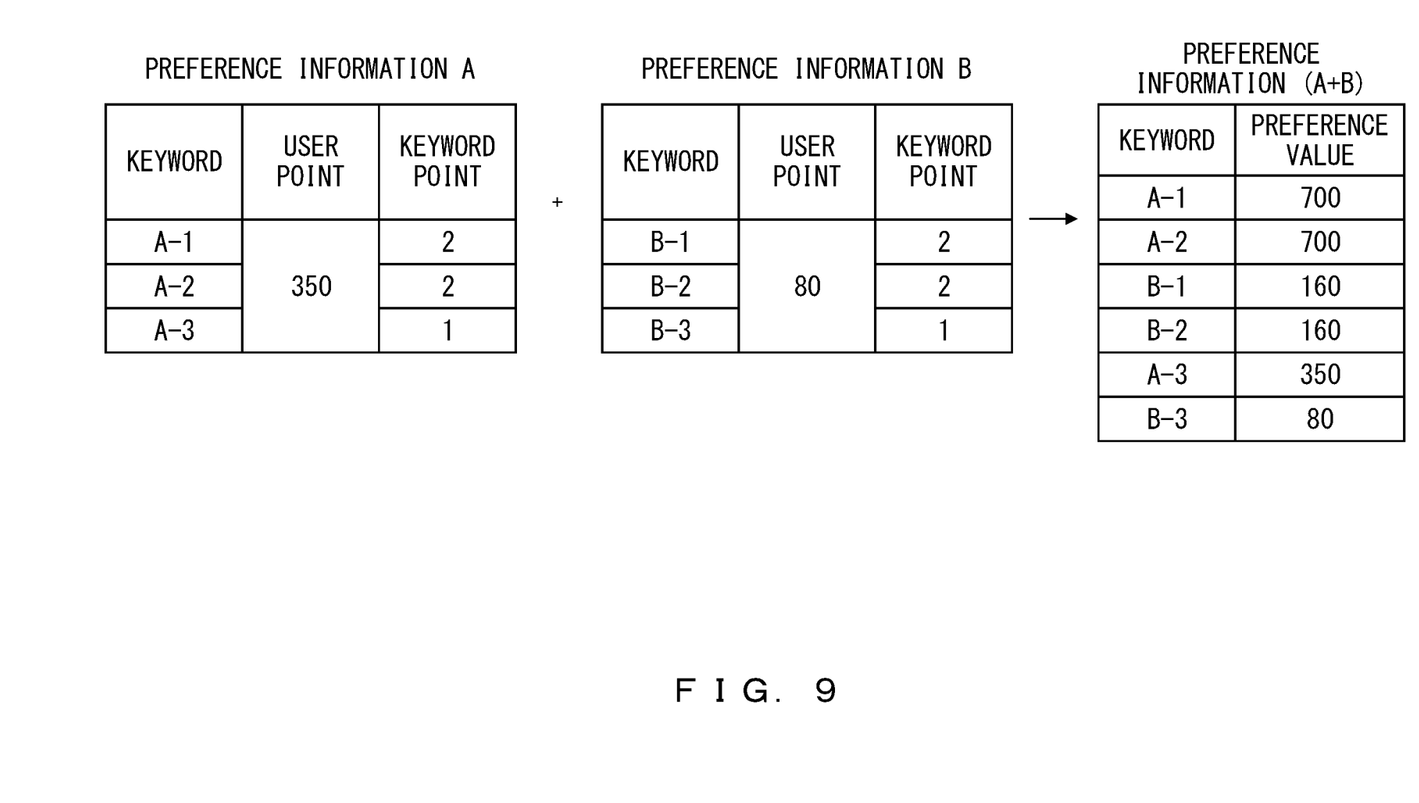
FIG. 9 is an explanatory view of the priority assigning process according to an embodiment of the present invention.

FIG. 9 is an explanatory view of the priority assigning process according to the present embodiment. As with the cases illustrated in FIGS. 5 through 7, the process performed when there are two users A and B is described below.

The present priority assigning process assigns a priority to a keyword in the descending order of the preference value acquired by multiplying a user point by a keyword point.

FIG. 9 is a practical example of a case in which the user point of the user A is 350, the keyword points of the keywords A-1, A-2, and A-3 are respectively 2, 2, and 1, the user point of the user B is 80, and the keyword points of the keywords B-1, B-2, and B-3 are respectively 2, 2, and 1.

The video recording and playback apparatus 100 multiplies the keyword point of each keyword included in the preference information about each user by a user point, and obtains a preference value of each keyword. Then, the video recording and playback apparatus 100 arranges the keywords in the descending order of the preference values to assign priorities.

The "preference information (A+B)" illustrated in FIG. 9 indicates the result of calculating preference values and rearranging the keywords. In the example in FIG. 9, the preference value is calculated for each keyword included in the preference information A and the preference information B. Then, the sequential order of the keywords is determined depending on the comparison of keyword points and the comparison of preference values.

In the example illustrated in FIG. 9, the keyword point of each keyword is referenced when assigning a priority of a keyword. A keyword having a large keyword point indicates that a larger number of users prefer the keyword. Then, in the example illustrated in FIG. 9, a higher priority is assigned to a keyword having a larger keyword point. For example, the keywords A-1, A-2, B-1, and B-2 have a keyword point of 2, and other keywords have the keyword point of 1. Therefore, in the example illustrated in FIG. 9, higher priorities are assigned to the keywords A-1, A-2, B-1, and B-2.

Next, a preference value is calculated for each keyword, and the obtained preference values are compared. In the example illustrated in FIG. 9, the preference values of the keywords A-1 and A-2 are 700, and the preference values of the keywords B-1 and B-2 are 160. Therefore, in the example illustrated in FIG. 9, the keywords A-1 and A-2 are assigned higher priorities than the keywords B-1 and B-2. The keywords A-1 and A-2 are equal in preference value. In this case, it can be considered that the keywords A-1 and A-2 are substantially equal in the preference level, but the priorities between them can be further determined based on another standard than the keyword point or the preference value. The same can be considered on the relationship between the keywords B-1 and B-2.

The keyword A-3 has a larger preference value than the keywords B-1 and B-2. However, since the keyword A-3 has the keyword point of "1", a priority lower than the keywords B-1 and B-2 is assigned to the keyword A-3.

Figure 10:
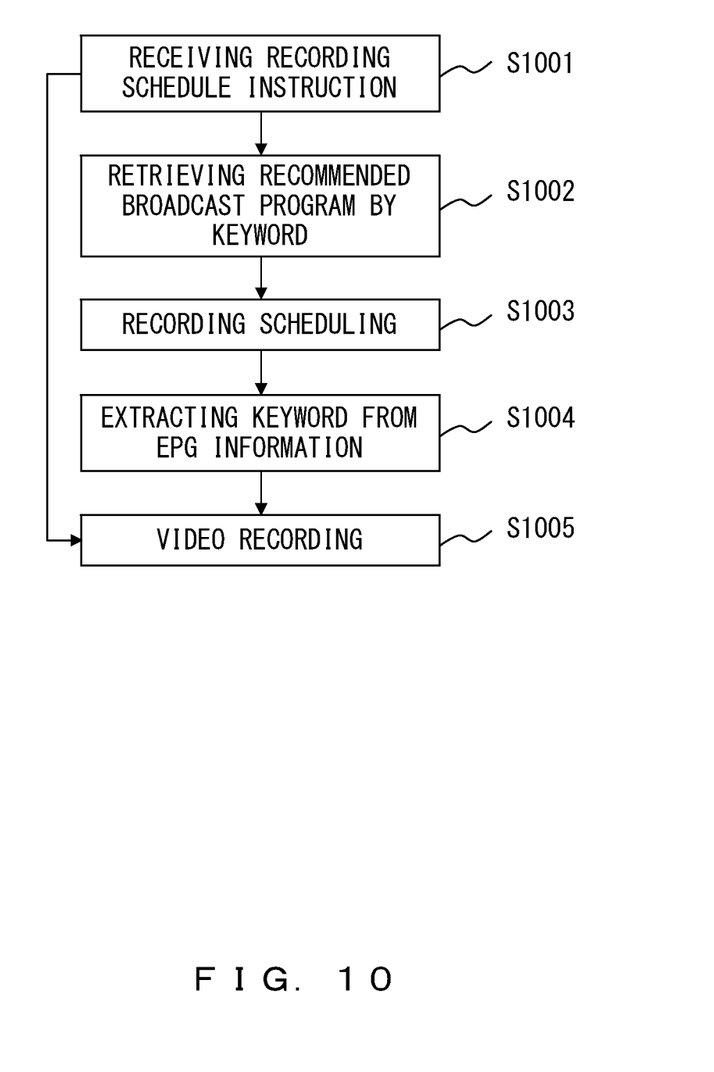
FIG. 10 is a flowchart for explanation of the recording scheduling process of the video recording and playback apparatus according to an embodiment of the present invention.

FIG. 10 is a flowchart of the video recording process of the video recording and playback apparatus 100 according to the present embodiment.

In step S1001, when the remote control reception unit 210 receives a recording schedule instruction, the video recording and playback apparatus 100 starts the recording scheduling process, and passes control to step S1002.

In step S1002, the video recording and playback apparatus 100 searches recommended broadcast programs using preference information as a keyword, and a retrieval result is displayed on a monitor as a video recording candidate.

For example, the video recording and playback apparatus 100 refers to the preference information assigned a priority in step S307 in FIG. 3, and searches the EPG using all or a part of the preference information as a keyword. Then, the video recording and playback apparatus 100 acquires the name of a broadcast program content including the keyword, and generates a list in which the acquired broadcast program contents are rearranged on the basis of the priorities. The list is referred to as a "video recording candidate list". Then, the video recording and playback apparatus 100 displays the video recording candidate list on the display screen of a monitor.

It is obvious that not only the video recording candidate list but also the EPG can be displayed by day of week and in a time series. The method of displaying a video recording candidate list and an EPG is not limited.

In step S1003, when a user selects any broadcast program title from the video recording candidate list (or the EPG display), the video recording and playback apparatus 100 sets the recording scheduling for the selected broadcast program contents.

In step S1004, the video recording and playback apparatus 100 extracts a keyword from the broadcast program information about the broadcast program titles selected in step S1003, and generates and updates the preference information for each of the identified users.

For example, the video recording and playback apparatus 100 acquires the information about the broadcast program contents selected in step S1003 from the EPG acquired in advance. Then, a keyword, a name of a performer and a category for example, is extracted from the information acquired from the EPG, and is stored as preference information.

In step S1005, the video recording and playback apparatus 100 performs video recording based on the recording scheduling set in step S1003. When the recording of the specified broadcast program contents is completed, the video recording and playback apparatus 100 stores the length of contents for the recorded broadcast program title.

In step S1001, a video record instruction can be directly issued. In this case, the video recording and playback apparatus 100 passes control to step S1005, and the video recording of the broadcast program contents being received at the moment can be started immediately.

Figure 11:
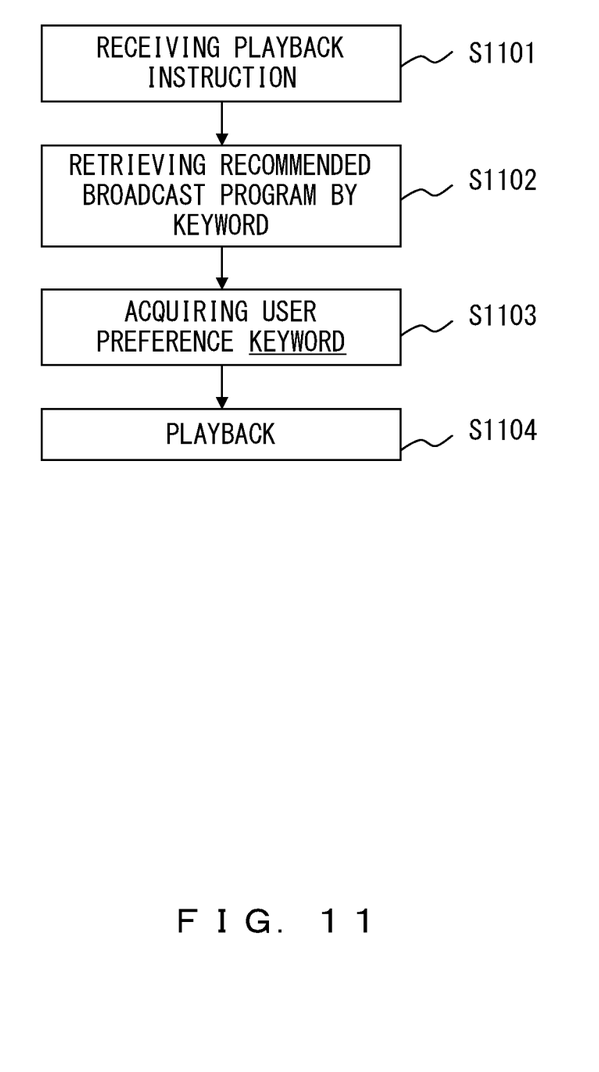
FIG. 11 is a flowchart for explanation of the playback process of the video recording and playback apparatus according to an embodiment of the present invention.

FIG. 11 is a flowchart of the playback process of the video recording and playback apparatus 100 according to the present embodiment.

In step S1101, when the remote control reception unit 210 receives a playback instruction, the video recording and playback apparatus 100 starts the playback process, and passes control to step S1102.

In step S1102, the video recording and playback apparatus 100 searches the recommended broadcast programs using the preference information as a keyword, generates a playback list from the retrieval result, and displays it on the monitor.

For example, the video recording and playback apparatus 100 refers to the preference information assigned a priority in step S307 in FIG. 3, and searches the hard disk drive 207 for the broadcast program contents matching the broadcast program contents of the referenced preference information. Then, the video recording and playback apparatus 100 rearranges the acquired broadcast program contents depending on the above-mentioned priorities, and generates a playback list. The video recording and playback apparatus 100 displays the playback list on a display screen of a monitor.

In step S1103, when the user selects any broadcast program title from the playback list, the video recording and playback apparatus 100 extracts a keyword from the broadcast program information about the selected broadcast program title, and generates and updates the preference information about the identified user.

For example, the video recording and playback apparatus 100 acquires information about the broadcast program contents selected from the EPG acquired in advance. Then, the video recording and playback apparatus 100 extracts a keyword of, for example, a name of a performer and a category, from the information acquired from the EPG, and is stored as preference information.

In step S1104, the video recording and playback apparatus 100 reads the recorded broadcast program title which has been selected in step S1101 from the hard disk drive 207, outputs the title to the display device of a display unit, and performs a playback process.

In this case, the video recording and playback apparatus 100 stores the playback time of the broadcast program title, and calculates a playback ratio for the played back broadcast program title. Then, the playback ratio is stored in the storage device for each broadcast program title together with the length of contents acquired in step S1005 corresponding to each user. The process in step S1103 is omitted in FIG. 3, but can be added to the flowchart illustrated in FIG. 3.

As described above, since the video recording and playback apparatus 100 generates preference information from the broadcast program information about the broadcast program contents designated by the operation information, the preference information about each user can be collected and accumulated without a special operation.

The video recording and playback apparatus 100 calculates a user point from the operation result information acquired in the video recording and playback processes etc. on the broadcast program contents, and a playback list etc. is displayed by assigning a priority to preference information depending on the user point. Therefore, every user can be presented with satisfactory contents.

Furthermore, the broadcast program contents matching the preferences of a larger number of users can be presented by calculating keyword points depending on the number of users of the preferences and displaying a playback list etc. depending on the priority among the keywords of the preference information.

As a result, useful TV broadcast programs and AV contents can be positively presented to the users having no specific preferences with respect to specific broadcast program contents.

The more the video recording and playback apparatus 100 is used, the more the preference information are accumulated and user points are added, thereby presenting the broadcast program contents matching the user preferences by using the video recording and playback apparatus 100 for a longer period.

According to the present video recording and playback apparatus, the preference information generation device extracts a keyword from the broadcast program information about the broadcast program contents designated by the operation information, and generates the preference information including a keyword for each user. Therefore, the preference information about each user can be collected and accumulated without an additional operation.

In addition, since the preference information priority assignment device assigns a priority to the preference information on the basis of the user point calculated from the operation result information obtained as a result of performing the video recording and playback process according to the operation information, the apparatus can provide a playback list etc. of broadcast program contents according to the preference information assigned with a priority. As a result, the apparatus can provide broadcast program contents satisfying the preferences of a larger number of users.

As described above, the present invention can provide a video recording and playback apparatus which can be shared and used by a plurality of users and provide useful contents for a larger number of users.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A video recording and playback apparatus which receives broadcast program contents and records or plays back video data, comprising:
   an operation information acquisition unit to acquire operation information about an operation by a user related to video recording and playback for a broadcast program content;
   a user identification unit to identify a user according to user identification information for identification of a user;
   a preference information generator to extract a keyword from broadcast program information relating to broadcast program contents which are designated by the operation information, and to generate preference information including the extracted keyword for each user;
   an operation result information acquisition unit to acquire operation result information as a result of performing at least one of video recording and playback process according to the operation information;
   a user point calculator to calculate, for each of the users, a user point which is a priority among a plurality of the users using a product of a recording time of broadcast program contents recorded in an operation by the user and a ratio of an actual playback time to the recording time; and a preference information priority assignment unit to determine a priority of the preference information using the user point.

2. The apparatus according to claim 1, further comprising an output unit to retrieve broadcast program contents that match a keyword in the preference information in the order of the priority or broadcast program contents that includes the keyword in corresponding broadcast program information, and to output the detected broadcast program contents to a display unit according to the priority.

3. The apparatus according to claim 1, wherein
the preference information priority assignment unit assigns a priority to the preference information in order from a keyword of preference information about a user having a higher user point.

4. The apparatus according to claim 1, wherein
the preference information priority assignment unit acquires a keyword one by one from preference information about each user, and assigns a priority to the keyword in order from a user having the higher user point.

5. The apparatus according to claim 1, wherein
the output unit retrieves only an information program including a keyword of preference information about the user having a highest user point, and outputs the retrieved information program to a display unit.

6. The apparatus according to claim 1, further comprising a keyword point calculator to compare keywords between the preference information and to calculate a keyword point as a point for each keyword depending on a result of the comparison, wherein
the preference information priority assignment unit assigns a priority to the broadcast program information depending on the user point and the keyword point.

7. The apparatus according to claim 6, wherein
the preference information includes at least a category and a performer of broadcast program information specified by an operation of the user.

8. The apparatus according to claim 7, wherein
the preference information priority assignment unit assigns a priority in a descending order of preference values acquired by multiplying the user point by the preference point.

9. A method for assigning a priority to preference information about each user in a video recording and playback apparatus which records and plays back broadcast program information specified by a plurality of users, the method comprising:
acquiring, by the video recording and playback apparatus, operation information about video recording and playback for specific broadcast program contents;
identifying, by the video recording and playback apparatus, a user according to user identification information for identification of a user;
extracting, by the video recording and playback apparatus, a keyword from broadcast program information relating to broadcast program contents which are designated by the operation information, and generating preference information including the keyword for each user;
acquiring, by the video recording and playback apparatus, operation result information as a result of performing video recording and playback processes according to the operation information; calculating a user point which is a priority among a plurality of the users using a product of a recording time of broadcast program contents recorded in an operation by the user and a ratio of an actual playback time to the recording time; and
determining, by the video recording and playback apparatus, a priority of the preference information using the user point.

10. The method according to claim 9, wherein:
the method further allows the video recording and playback apparatus to perform comparing keywords between the preference information, and calculating a keyword point as a point for each keyword depending on a result of the comparison; and assigning a priority to the broadcast program information depending on the user point and the preference point.

11. A non-transitory computer-readable recording medium having stored therein a program for causing a video recording and playback apparatus to execute a process for recording and playing back broadcast program, the process comprising:
acquiring operation information about video recording and playback for specific broadcast program contents;
identifying a user according to user identification information for identification of a user;
extracting a keyword from broadcast program information relating to broadcast program contents which are designated by the operation information, and generating preference information including the keyword for each user;
acquiring operation result information as a result of performing video recording and playback processes according to the operation information;
calculating a user point which is a priority among a plurality of the users using a product of a recording time of broadcast program contents recorded in an operation by the user and a ratio of an actual playback time to the recording time; and
determining a priority of the preference information using the user point.

12. The non-transitory computer-readable recording medium according to claim 11, the process further comprising:
comparing keywords between the preference information, and calculating a keyword point as a point for each keyword depending on a result of the comparison; and
assigning a priority to the broadcast program information depending on the user point and the preference point.

13. A video recording and playback apparatus which generates a list of candidate for contents to be recorded or played back using information about a reference of a user, the video recording and playback apparatus comprising:
a unit to identify the user;
a unit to determine a video recording and playback state of the contents of the identified user;
a unit to add a user point which is a priority of the identified user depending on the determined video recording and playback state, wherein the user point is a product of a recording time of broadcast program contents recorded in an operation by the user and a ratio of an actual playback time to the recording time;
a unit to record preference information for each user;
a unit to compare the user point added to each user with another, and assign a priority to preference information about each user using the comparison result; and
a unit to generate a list of the contents using the preference information assigned the priority.

14. The apparatus according to claim 13, further comprising
a unit to determine a number of users who have recorded the preference information with reference to the unit to record the information, wherein the unit to assign the priority assigns a higher priority to preference information used by a larger number of determined users.

* * * * *